Nov. 15, 1966  M. B. EATON  3,285,674
CONTROL VALVES FOR AIR BRAKING SYSTEMS
Filed July 10, 1964  3 Sheets-Sheet 1

MAURICE B. EATON

Scrivener Parker Scrivener & Clarke

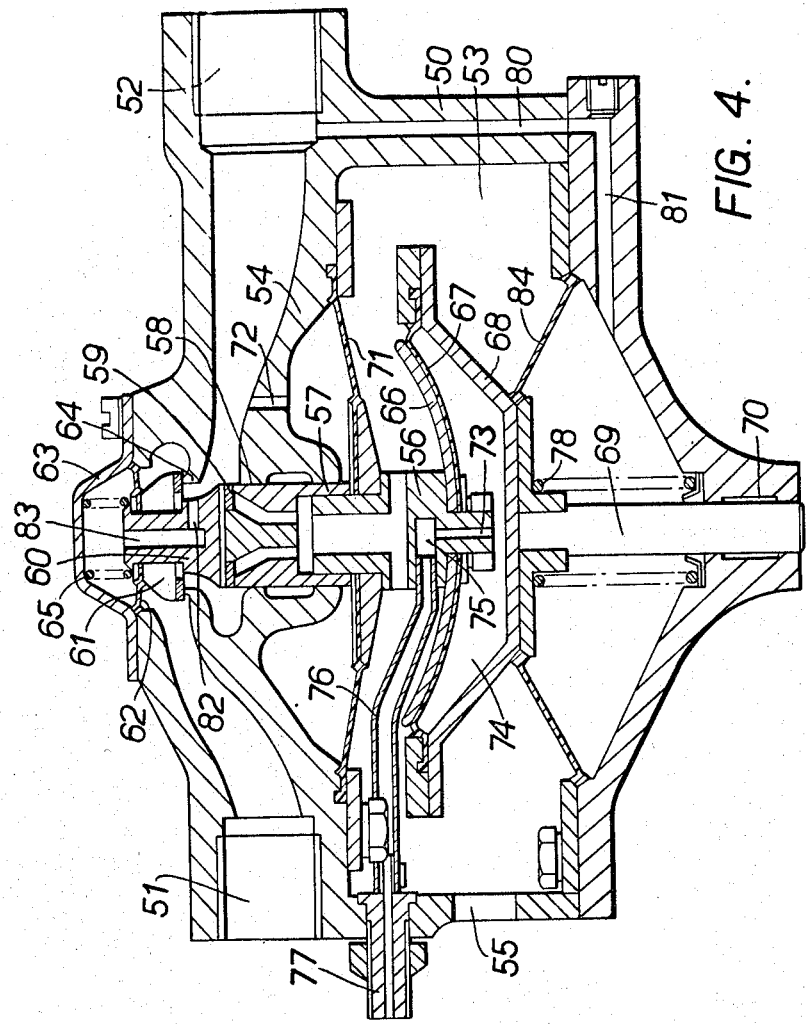

United States Patent Office 3,285,674
Patented Nov. 15, 1966

3,285,674
CONTROL VALVES FOR AIR BRAKING SYSTEMS
Maurice Barry Eaton, Birmingham, England, assignor to Girling Limited, Birmingham, England, a British company
Filed July 10, 1964, Ser. No. 381,843
Claims priority, application Great Britain, July 17, 1963, 25,335/63
2 Claims. (Cl. 303—40)

This invention relates to improvements in valves for the control of fluid under pressure and more particularly to a control valve for a fluid pressure actuated vehicle braking system of the kind in which the pressure of fluid supplied to brake cylinders is regulated by a control valve in accordance with variation in the loading of the vehicle.

In a control valve for a vehicle braking system according to our invention a balanced piston or diaphragm of which the effective area is variable with the vehicle loading is adapted to regulate automatically the pressure of fluid supplied to brake cylinders by means of a second piston or diaphragm of constant area.

The area of the balanced piston or diaphragm is dependent upon the axial position of a member connected to the balanced piston or diaphragm which is controlled by a control rod connected at one end to this member, and the other end of the control rod is engageable with or connected directly or indirectly to a component of the vehicle which responses to the loading on the vehicle.

Preferably the control valve is mounted on an unsprung component of the vehicle and the end of the control rod remote from the axially movable member is connected directly or indirectly by a linkage or is engageable with means such as a cam, wedge or like mechanism responsive to variations in the loading on the vehicle. Conveniently the control rod can engage means attached to the secondary spring of the vehicle.

Two forms of control valve in accordance with our invention and a modification of one of the valves are illustrated in the accompanying drawings in which:

FIGURE 4 is a vertical section of the complete-valve in another form.

Figure 1:
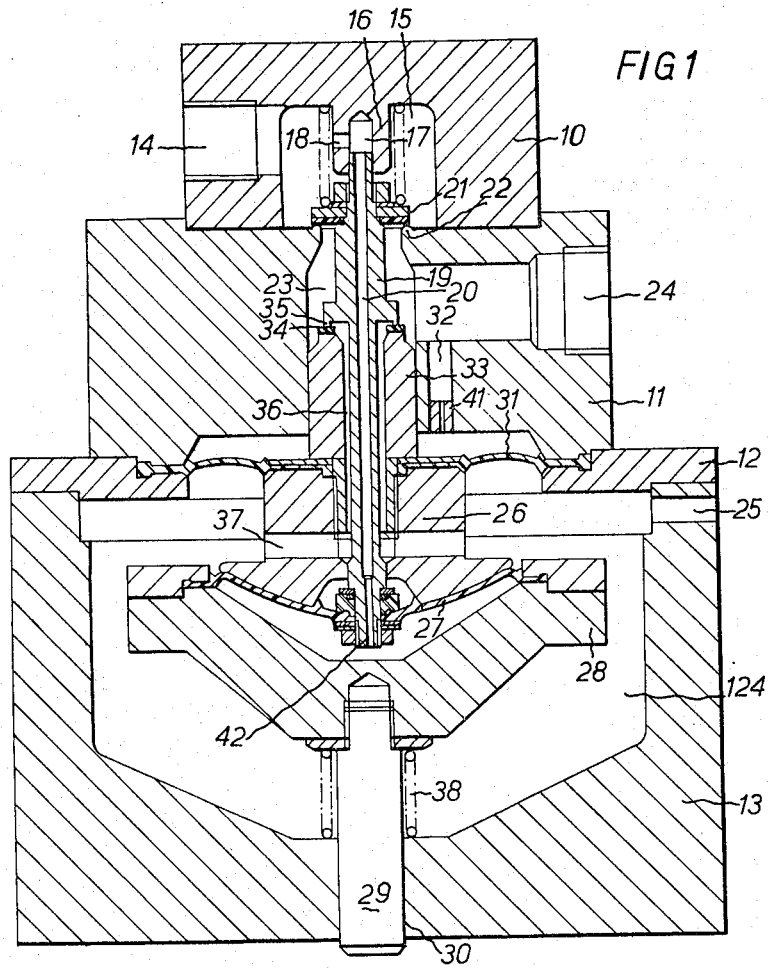
FIGURE 1 is a vertical section of the complete valve in one form.
Figure 2:
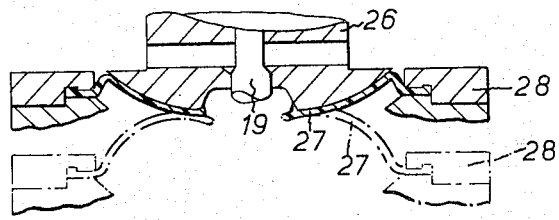
FIGURE 2 is a section of part of the valve of FIGURE 1 showing the actuating diaphragm in its positions of maximum and minimum area.

In the control valve illustrated in FIGURES 1 and 2, the valve body is assembled from four cooperating parts 10, 11, 12, 13 of which the upper part 10 has an inlet passage 14 leading into a chamber 15 formed around a downwardly extending axial projection 16 having a blind axial bore 17 communicating with the chamber 15 through a radial port 18. In the axial bore is slidably received the upper end of an axially movable rod 19 provided with an axial bore 20. Adjacent to its upper end the rod carries a plate valve member 21 which is normally spring urged into engagement with an annular seating 22 formed around the upper end of an axial bore 23 extending through the part 11. The bore is in communication with an outlet passage 24. The axial rod 19 extends through the bore 23 and into a chamber 124 in the part 13 which is connected to exhaust, normally atmosphere, through a passage 25. In the chamber 124 is housed a piston 26 slidably received on the rod adjacent to its lower end. The piston is supported on the rod by a flexible diaphragm 27 clamped at its outer edge to a control member 28 of substantially conical section to the lower end of which is connected a control rod 29 working through an axial bore 30 in the lower end of the part 13.

The diaphragm is made of effectively non-stretch material in the form of two ply fabric coated with "Neoprene" or other synthetic rubber so that during its life it does not suffer from any mal-formation and can roll over the piston freely and without excess stressing. To assist the rolling action the lower face of the piston which co-operates with the diaphragm is formed of a part-spherical shape.

At is upper end the piston 26 is supported by a flexible diaphragm 31 which is made from similar material to the diaphragm 27. The diaphragm 31 is clamped at its inner edge to the piston and at its outer edge between a machined annular face on the part 12 and a complementary face on the part 11. The upper face of the diaphragm is subjected to pressure in the outlet passage 24 through an axial passage 32 in the part 11 and its lower face is subjected to the pressure within the chamber 124.

At its upper end the piston 26 has a hollow extension 33 which works in the bore 23 in the part 11 and at its upper end the extension is formed with an annular valve member 34 adapted to co-operate with an annular seating 35 formed on the portion of the axial rod within the bore. An annular space 36 between the extension 33 and the rod 19 communicates with the chamber 124 through radial passages 37 in the piston.

The control valve is mounted on an unsprung component of a vehicle and the lower end of the control rod 29 is connected directly or indirectly through a linkage to a mechanism responsive to variations in the loading on the vehicle such as a cam, wedge or the like. Alternatively the control rod may engage means attached to a secondary spring of the vehicle. The control rod is thus held in an axial position determined by the loading on the vehicle.

In the inoperative position the control rod is held out of engagement with the mechanism responsive to variations in the loading of the vehicle by a spring 38 positioned between the lower end of the control member 28 and the adjacent face of the lower end of the chamber 124. This ensures that the movable parts of the valve remain static on all occasions except brake applications and the movable parts of the valve are not subjected to relative movement under irregularities in the road or track during operation of the vehicle. This provides the parts with a long working life.

When the brakes on the vehicle are to be applied, air under pressure is supplied to the inlet passage 14 of the control valve and is fed down the axial bore 20 in the control valve and into a chamber formed between the underside of the diaphragm 27 and the adjacent inner face of the control member 28. The pressure of the air acts on the control member moving it in a downward direction which urges the control rod 29 into engagement with the mechanism responsive to variations in the loading of the vehicle. At the same time the pressure acts on the diaphragm 27 beneath the piston 26 and the diaphragm is moved in an upward direction carrying with it the piston 26 and the axial rod 19. The plate valve member 21 on the upper end of the rod is moved away from its seating 22 and air under pressure passes through the portion of the bore 23 above the piston extension 33 and to the slave cylinders on the vehicle's wheels by way of the outlet passage 24. At the same time air from the outlet passage acts upon the upper face of the diaphragm 31 and the piston 26 is held in a balanced position corresponding to the desired differential pressure between actual supply pressure and brake cylinder pressure.

Changes in the loading of the vehicle alter the axial position of the control member 28 thereby adjusting the effective area of the actuating diaphragm 27 itself. As the convoluted shape of the diaphragm is such that its effective area has a linear relationship with its stroke and the braking effort is controlled by the effective area of the diaphragm, the pressure applied to the brake cylinders is at all times proportional to the loading of the vehicle.

In FIGURE 2 there is illustrated in full lines the form assumed by the diaphragm when the loading is high and its effective area is at a maximum. The form assumed by the diaphragm when the loading is low and its effective area is at a minimum is shown in chain dotted lines.

If for any reason the upward force acting upon the piston 26 through the diaphragm 27 is reduced, as by reduction in the supply pressure, the pressure in the outlet passage acting on the diaphragm 31 through the passage 32 exerts a force on the piston which moves it in a downward direction and the valve member 34 is moved away from its seating 35. This permits the air in the outlet passage 24 to pass to atmosphere through the annular space 36, passages 37 and the exhaust passage 25 thereby automatically relieving the braking pressure.

Figure 3:
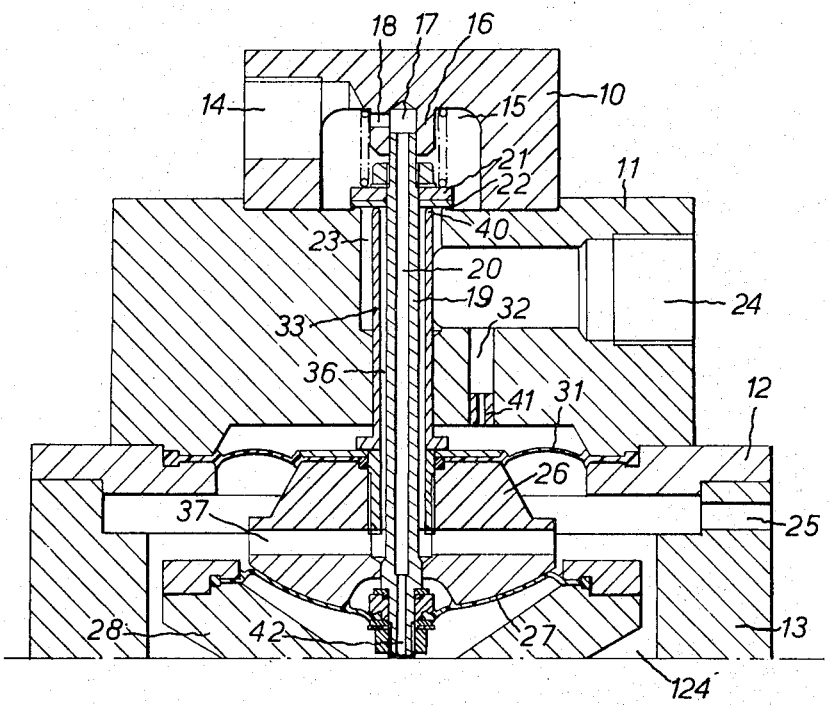
FIGURE 3 is a vertical section of the upper part of the valve illustrated in FIGURE 1 and FIGURE 2 showing a modification.

In the modification shown in FIGURE 3 the annular seating 35 on the axial rod is omitted and the piston extension 33 is in the form of a hollow sleeve of which its upper end is formed as a valve seating 40 which is concentric with the valve seating 22 adapted to co-operate with the spring loaded valve member 21. The construction and operation of this modified form of valve is otherwise the same as the embodiment described above with reference to FIGURE 1 and corresponding reference numerals have been used to indicate corresponding parts.

In both the embodiments illustrated in FIGURES 1, 2 and 3, a choke in the form of a metered orifice 41 may be positioned in the lower end of the passage 32 which connects the outlet passage 24 to the space above the diaphragm 31. The choke stabilises the operation of the control valve and ensures early balance without excessive pressure fluctuation. As illustrated a portion 42 of the bore 20 at the lower end of the axial rod 19 may also be formed of a diameter smaller than the remainder of the bore for the same purpose.

In the control valve illustrated in FIGURE 4, 50 is a valve body having an inlet passage 51 for connection to a reservoir containing air under constant pressure and an outlet passage 52 for connection to the slave cylinders on the vehicle wheels. The passages are separated from a control chamber 53 by a substantially horizontal partition 54 and the control chamber is connected to exhaust, normally atmosphere, through a port 55.

In the chamber 53 is housed a piston 56 having in screw-threaded engagement with its upper portion a hollow extension sleeve 57 which is slidably received in an axial bore 58 in the partition. At its upper end the sleeve 57 co-operates with an annular seating 59 on a stem 60 of a valve member 61 which controls communication between the inlet and outlet passages. The valve member is connected to a flexible diaphragm 62 clamped at its inner edge to the valve member and at its outer edge between the valve body and an end cap 63, the valve member being normally held in engagement with an annular seating 64 between the passages by a spring 65 which abuts between the valve member and the end cap. The spring 65 is of sufficient strength to hold the valve member against its seating in opposition to the pressure in the reservoir which acts on the underside of the diaphragm 62 and tends to move the valve member away from its seating.

The piston 56 at its lower end carries a part spherical annular flange portion 66 over which the piston is supported in the control chamber by a flexible diaphragm 67 clamped at its inner edge to the lower end of the piston and at its outer edge to a control member 68. To the lower end of the control member is connected a control rod 69 working through an axial bore 70 in the lower end of the valve body.

At its upper end the piston 56 is supported by a flexible diaphragm 71 clamped at its inner edge to the piston and at its outer edge to the partition 54. The upper face of the diaphragm 71 is subjected to the pressure in the outlet passage 52 through an axial passage 72 in the partition and its lower face is subjected to the pressure within the control chamber 53.

The diaphragms 67 and 71 are constructed from the same material as the corresponding diaphragms in the arrangements described above with reference to FIGURES 1-3.

In the piston 56 at its lower end there is formed a blind axial bore 73 communicating at its lower end with a chamber 74 between the lower face of the diaphragm 67 and the control member 68. At its upper end the bore 73 leads into a radial passage 75 which is connected through a flexible pipe 76 to a union 77 in the valve body for connection to a device such as a valve which is operable by the driver to control the admission of air under pressure to the chamber 74.

The control valve is mounted in the vehicle as described above with reference to the preceding embodiments and in the inoperative position the control rod 69 is held out of engagement with the mechanism responsive to variations in the loading on the vehicle by a spring 78 positioned between the lower end of the control member 68 and the adjacent face of the lower end of the valve body.

The inlet passage 51 is connected to a reservoir containing air under pressure.

When the brakes on the vehicle are to be applied air under pressure is supplied through the flexible pipe 76 to the chamber 74 and acts on the control member 68 which urges the control rod 69 into engagement with the mechanism responsive to variations in the loading on the vehicle. At the same time the pressure acts on the diaphragm 67 below the piston 56 and the diaphragm is moved upwardly carrying with it the piston and extension sleeve 57. This moves the valve member 61 away from its seating and air from the reservoir passes to the slave cylinders on the vehicle wheel through the outlet passage 52.

This pressure of the air in the outlet passage acts on the upper surface of the diaphragm 62 through comcunicating passages 82, 83 in the valve member 61 which is held in a balanced position corresponding to the differential pressure between the pressure of the air in the reservoir and the brake cylinder pressure.

In another arrangement the passages 82, 83 may be omitted and an opening provided in the end cap 63 so that the diaphragm 62 is subjected on its upper surface to atmospheric pressure.

At the same time air from the outlet passage acts on the upper face of the diaphragm 71 and the piston 56 is held in a balanced position corresponding to the derived differential supply pressure between the applying pressure from the valve operated by the driver and the brake cylinder pressure.

Changes in the loading of the vehicle alter the axial position of the control member 68 thereby adjusting the effective area of the actuating diaphragm 67 itself. As the convoluted shape of the diaphragm is chosen as described above with reference to the preceding embodiments, the pressure applied to the brake cylinders is at all times proportional to the loading on the vehicle.

If for any reason the upward force acting on the piston 56 through the diaphragm 67 is reduced, as by reduction in the pressure of the air supplied to the chamber 74, the pressure in the outlet passage 52 acting on the diaphragm 71 exerts a force on the piston which moves it in a downward direction moving the hollow extension sleeve 57 away from the seating 59. This permits air from the outlet passage 52 to pass to atmosphere through the hollow sleeve 57, communicating axial and radial passages 78, 79 in the piston, the control chamber 53 and the exhaust passage 55, thereby automatically relieving the braking pressure.

A diaphragm 84 of fixed area is clamped at its inner edge to the control member 68 and at its outer edge to the lower end of the valve body. The diaphragm on its upper surface is subjected to the pressure within the control chamber 53 and on its lower surface to the pressure in the outlet passage 52 through communicating passages 80, 81 in the valve body. Thus when the valve is actuated to operate the vehicle brakes, the outlet pressure acts on the lower surface of the diaphragm 84 tending to move the control member 68 in an upward direction against the pressure in chamber 74 acting on the control member in the opposite direction.

By carefully chosing the area of the diaphragm the control member 68 may be held in a balanced condition or it may be provided with a slight bias in a downward direction.

What is claimed is:

1. A fluid control valve for fluid pressure actuated vehicle braking systems incorporating at least one brake cylinder, a supply source of fluid at constant pressure, a control fluid pressure source and brake applying means controlling control fluid pressure comprising a valve body in which is formed an inlet passage for connection to said fluid pressure source, an outlet passage for connection to said brake cylinder, a valve seating in the valve body between said inlet passage and said outlet passage, a piston located in a chamber in said valve body, an exhaust passage in said valve body connecting said chamber to atmosphere, a valve member adapted to cooperate with said valve seating to control communication between said inlet passage and said outlet passage, a first diaphragm of fixed area connected between said piston and said valve body and subjected on one side to pressure in said outlet passage and on an opposite side to pressure in said chamber, a control member in said chamber adapted to be movable into an operating position dictated by vehicle loading, a second diaphragm of variable area connected at its inner and outer edges between the lower end of the piston and said control member, the effective area of said second diaphragm being variable in accordance with the position of the control member, the second diaphragm and the control member defining between themselves a compartment subjected to said control fluid pressure which is controlled by said brake applying means, a stem on said piston co-operating with said valve member controlling communication between said inlet passage and said outlet passage, a first diacontrol fluid pressure being supplied to said compartment said valve member is moved away from said valve seating to provide communication between said inlet passage and said outlet passage, the movement of the valve member being controlled in accordance with differential pressure between the control fluid pressure and outlet pressure of which said outlet pressure is at all times proportional to the loading on the vehicle, and a further flexible diaphragm cooperating with said control member of which the diaphragm on one side is subjected to pressure in said outlet passage.

2. A fluid control valve for fluid pressure actuated vehicle braking systems incorporating at least one brake cylinder, a supply source of fluid at constant pressure, a control fluid pressure source and brake applying means controlling control fluid pressure comprising a valve body in which is formed an inlet passage for connection to said fluid pressure source, an outlet passage for connection to said brake cylinder, a first valve seating in the valve body between said inlet passage and said outlet passage, a piston located in a chamber in said valve body, an exhaust passage in said valve body connecting said chamber to atmosphere, a first valve member adapted to co-operate with said valve seating to control communication between said inlet passage and said outlet passage, a first diaphragm of fixed area connected between said piston and said valve body and subjected on one side to pressure in said outlet passage and on an opposite side to pressure in said chamber, a control member in said chamber adapted to be movable into an operating position dictated by vehicle loading, a second diaphragm of variable area connected at its inner and outer edges between the lower end of the piston and said control member, the effective area of said second diaphragm being variable in accordance with the position of the control member, the second diaphragm and the control member defining between themselves a compartment subjected to said control fluid pressure which is controlled by said brake applying means, a hollow stem on said piston co-operating with said valve member controlling communication between said inlet passage and said outlet passage, whereby upon control fluid pressure being supplied to said compartment said first valve member is moved away from said first valve seating to provide communication between said inlet passage and said outlet passage, the movement of the valve member being controlled in accordance with differential pressure between the control fluid pressure and outlet pressure of which said outlet pressure is not at all times proportional to the loading on the vehicle, a stem on said first valve member, a second valve seating on said valve stem with which said hollow stem on said piston is adapted to co-operate to control communicating between said outlet passage and said exhaust passage, whereby upon reduction of said control fluid pressure the hollow stem on said piston is moved away from said first valve member by movement of the piston controlled by said first diaphragm subjected to outlet fluid pressure, and a further flexible diaphragm cooperating with said control member of which the diaphragm on one side is subjected to pressure in said outlet passage.

References Cited by the Examiner

UNITED STATES PATENTS

| | | | |
|---|---|---|---|
| 2,450,464 | 10/1948 | Bent | 303—22 |
| 2,986,427 | 5/1961 | McClure et al. | 303—22 |
| 3,188,149 | 6/1965 | Pekrul | 303—22 |

EUGENE G. BOTZ, *Primary Examiner.*